US006821468B2

(12) United States Patent
Stegmaier

(10) Patent No.: US 6,821,468 B2
(45) Date of Patent: Nov. 23, 2004

(54) SOFT GRIP TOOL HANDLE AND METHOD OF MANUFACTURE

(75) Inventor: Truman Stegmaier, Lebanon, MO (US)

(73) Assignee: Kraft Tool Company, Shawnee, KS (US)

( * ) Notice: Subject to any disclaimer, the term of this patent is extended or adjusted under 35 U.S.C. 154(b) by 146 days.

(21) Appl. No.: 10/120,706

(22) Filed: Apr. 11, 2002

(65) Prior Publication Data

US 2002/0108213 A1 Aug. 15, 2002

Related U.S. Application Data

(62) Division of application No. 09/717,194, filed on Nov. 21, 2000, now Pat. No. 6,473,939.

(51) Int. Cl.[7] .............................................. B29C 45/16
(52) U.S. Cl. ....................... 264/247; 264/254; 264/255; 264/273; 264/328.8
(58) Field of Search .............................. 264/273, 328.8, 264/243, 245–247, 250, 254, 255, 279

(56) References Cited

U.S. PATENT DOCUMENTS

| 2,298,365 | A | * | 10/1942 | Gits et al. ................... 264/247 |
| 2,335,872 | A | * | 12/1943 | Mitchell ...................... 30/342 |
| 3,206,204 | A | | 9/1965 | Lacoste |
| 3,354,249 | A | * | 11/1967 | Morin ........................ 264/161 |
| 3,813,729 | A | | 6/1974 | Szabo et al. |
| 4,261,078 | A | | 4/1981 | Edwards et al. |
| 4,340,990 | A | | 7/1982 | Seynhaeve |
| 4,364,150 | A | | 12/1982 | Remington |
| 4,721,021 | A | | 1/1988 | Kusznir |
| 4,722,637 | A | | 2/1988 | Glesmann |
| 4,837,892 | A | | 6/1989 | Lo |
| 5,303,451 | A | | 4/1994 | Graviss et al. |
| 5,305,660 | A | | 4/1994 | Hasegawa |
| 5,327,612 | A | | 7/1994 | Kelsay |
| 5,376,325 | A | * | 12/1994 | Ormson ...................... 264/254 |
| 5,446,941 | A | | 9/1995 | Kelsay |
| 5,522,111 | A | | 6/1996 | Kelsay et al. |
| 5,579,556 | A | | 12/1996 | Chung |
| 5,581,845 | A | | 12/1996 | Yang |
| 5,615,445 | A | | 4/1997 | Kelsay et al. |
| 5,713,096 | A | | 2/1998 | Kelsay et al. |
| 5,737,795 | A | | 4/1998 | Murders |
| 5,781,956 | A | | 7/1998 | Kelsay et al. |
| 5,791,009 | A | | 8/1998 | McComber et al. |
| 5,839,163 | A | | 11/1998 | Hellmann |
| 6,195,830 | B1 | | 3/2001 | Bruschi |
| 6,247,204 | B1 | | 6/2001 | Hamby et al. |
| 6,264,869 | B1 | * | 7/2001 | Notarpietro et al. ........ 264/247 |

* cited by examiner

Primary Examiner—Jill L. Heitbrink
(74) Attorney, Agent, or Firm—John C. McMahon

(57) ABSTRACT

A tool handle having a central gripping portion joined with a pair of opposed fastening portions. The gripping portion has an internal shell with an overcoating. The overcoating is two-part having first and second external sections having at least one different characteristic. The first overcoating section is applied in a first mold and thereafter the resulting structure is placed in a second mold wherein molding material is flowed through a channel in the interior of said shell from an underside of the handle to an exterior surface of the shell. The first and second sections cooperate to produce a continuous overcoating having sections with different characteristics that are free from molding blemishes.

3 Claims, 4 Drawing Sheets

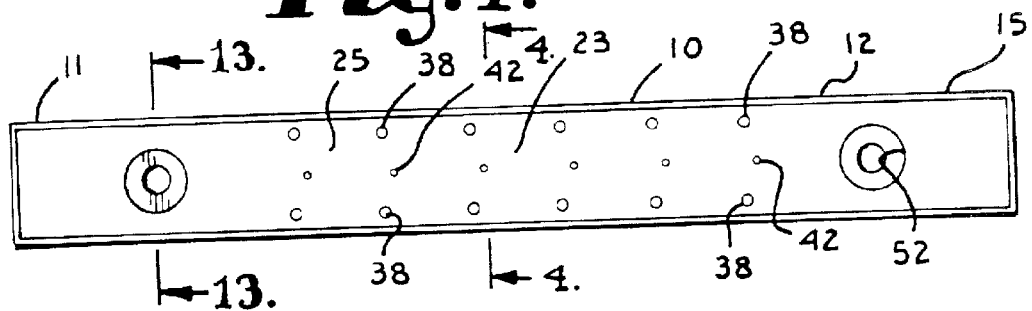
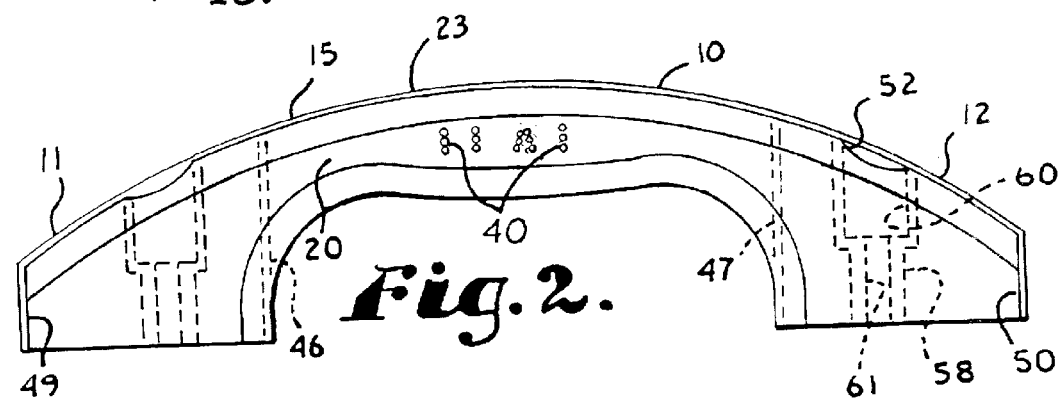
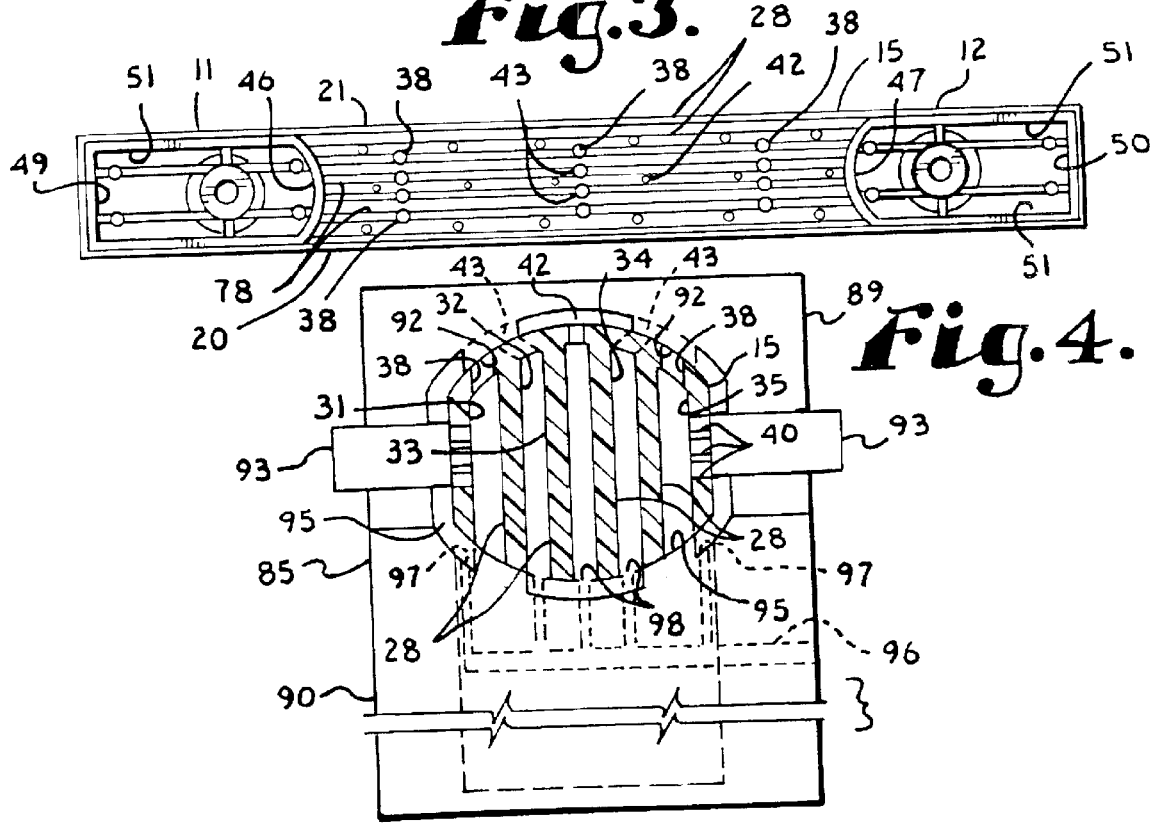

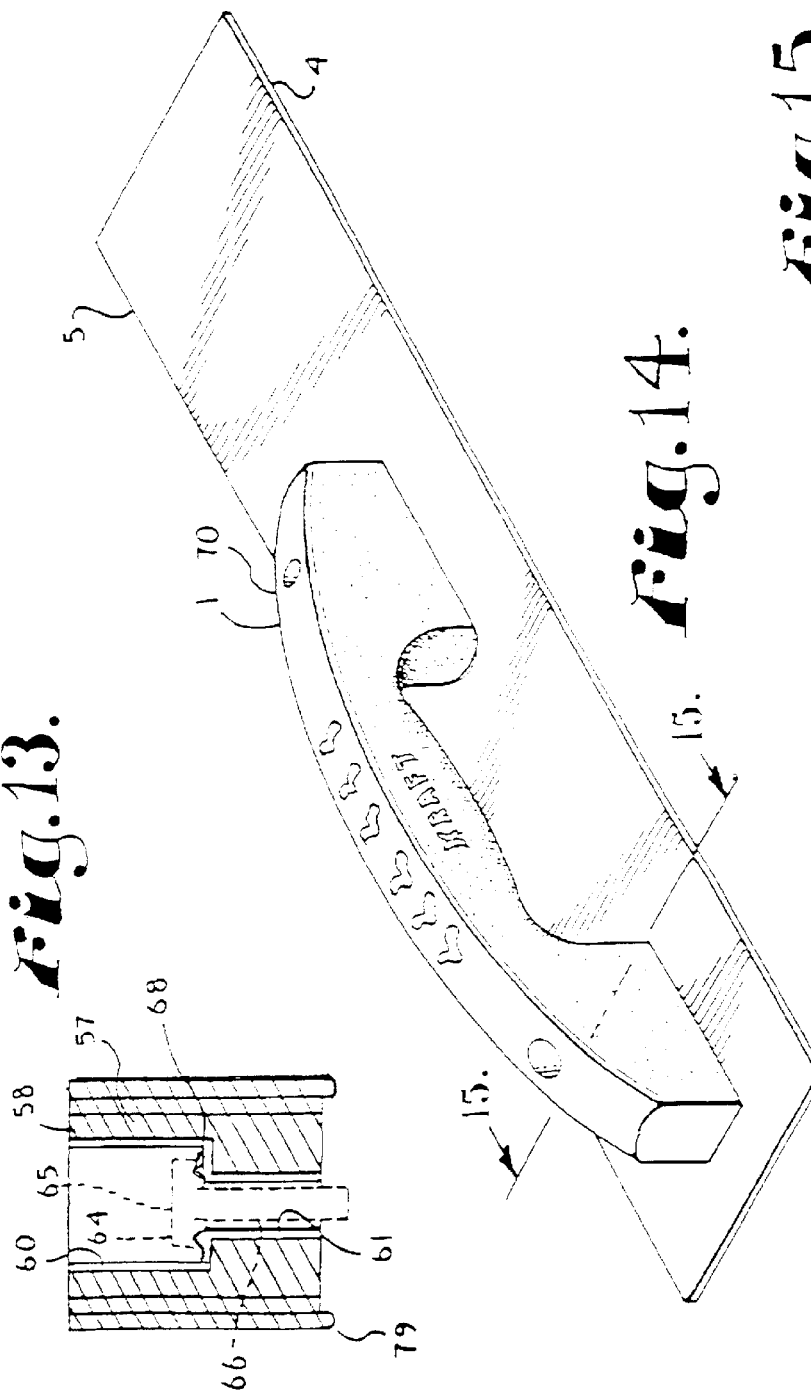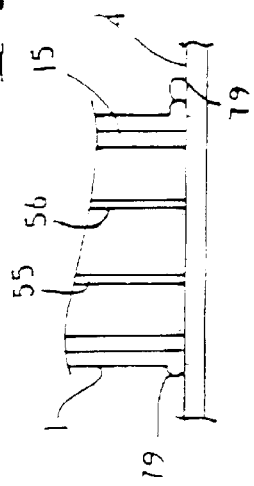

SOFT GRIP TOOL HANDLE AND METHOD OF MANUFACTURE

CROSS-REFERENCE TO RELATED APPLICATION

The present application is a divisional application of U.S. Ser. No. 09/717,194 filed Nov. 21, 2000, now U.S. Pat. No. 6,473,939.

BACKGROUND OF THE INVENTION

This application is directed to a tool handle having an inner shell with a molded overlay wherein the overlay includes at least two side by side sections having different characteristics and a method of manufacture thereof such that the sections blend together smoothly and do not include molding gate marks.

Construction workers require tools that are durable and will withstand significant daily use over long periods of time. Preferably, such tools are also comfortable in the hand of the user and provide the user with a good grip. Handles are, therefore, often constructed with an inner shell that provides form and shape to the handle and then soft pliable overlay that provides a comfortable surface to the user.

Such handles also represent a substantial amount of weight in many tools such as trowels and floats. Consequently, it is desirable to reduce the weight as much as possible. For this reason, portions of such handle where the handle attaches to a tool may be hollow, whereas the portion of the handle that is to be grasped by the user may include more internal structure or be solid in order to prevent collapse due to pressure exerted by the craftsman during use.

Because such handles must be designed to comfortably fit the grip of the user, provide structure to attach to a tool, have certain portions that are hollow to reduce weight and for other reasons, the overall handle is typically a complex geometric structure which can present problems in molding, but the outer surface can be molded by most modern molding techniques when just a uniform over-mold or cover is applied to a shell.

However, it is sometimes also desirable to have an over-mold that has sections with different characteristics. For example, it may be desirable to have sections or inlays with different degrees of softness or resiliency to the remainder of the overlay so as to improve the gripping characteristics in certain areas or, more commonly, it may be desirable to have sections with significantly different colors for purposes of either design or providing information to the user.

In some instances it is possible to provide a base over-mold and then apply very superficially or just on the surface of the over-mold very thin layers of material that incorporates the second characteristic. In commercial hand tools, this does not work very well, since the tools are used for a long time and the superficial regions wear away fairly rapidly. Consequently, it is preferably that the two different characteristics be provided by sections of the over-mold that have approximately the same depth and, therefore, are likely to not wear out at different times. It is possible to apply to a shell a first overlay that covers a portion of the shell and has a first characteristic and then apply a second overlay that has the second characteristic by using a separate second exterior mold to produce letters, geometric designs or the like. However, when conventional molding techniques are used to apply inlays or the second section in and about the first section of the overlay, blemishes are created due to normal gating and parting lines that are highly undesirable. That is, at the end of the molding process, the molding material that is supplied to those sections through the mold must be somehow separated from the channels in the mold that are supplying the material. When the channels supply the molding material from the exterior of the exterior of the device gate marks and parting lines occur. Therefore, it is desirable to provide a molding method or technique that produces a final handle that includes an outer grippable portion that has an overlay that is comfortable to the user and that has separate external sections of an overlay that have different characteristics such as color and which are substantially free from blemishes that would be caused by molding the second portions of the outer mold by use of conventional molding techniques.

SUMMARY OF THE INVENTION

A handle for use in conjunction with commercial tools and the like includes a central carrier or shell for providing shape and strength to the handle. The shell has an exterior surface and a series of internal ribs in a gripping portion of the handle. The shell also includes at least one attachment portion for joining the shell to the tool.

The shell is initially placed in a first mold wherein a first over-mold is placed on the shell. The shell includes at least one internal channel running therethrough that communicates with the surface. The first mold allows for injection of a soft molding material onto the surface of the shell except in certain regions that are blocked by the mold. The blocked regions communicate with the internal channel shell and the mold is designed to cooperatively blocked flow of material through the channel and flow into the block regions during the first molding procedure.

After removal of the shell from the first mold, it has a first section of an over-mold thereon that covers a substantial portion of the surface and has adjacent regions that include no over-mold and which are joined to the shell channel. The channel also joins with an underside of the handle grip portion.

The handle with the first over-mold thereon is then placed in a second mold. The second mold allows for flow of a second molding material into the regions that were blocked by the first mold. The second material flows from the underside of the handle, through the channel and into the second over-mold open regions to produce second over-mold sections having different characteristics than the first over-mold sections. Often the second over-mold sections are inlays of the first over-mold section or completely surrounded by the first over-mold section. Subsequently, the second mold is removed. The first over-mold and the second over-mold are adjacent to one another and form a smooth transition therebetween without blemishes caused by gating or parting lines except on the underside of the handle where such blemishes are not visible.

The fastening section or sections preferably are hollow and have cavities so as to reduce weight of the handle. In order to seal about the cavities of the fastening sections, the over-mold is extended slightly beyond the shell whereat the handle abuts with the tool. In this manner, as the tool is secured to the handle by a fastener, pressure exerted compresses the over-mold extension and produces a seal between the tool and the hollow cavity of the fastening section. Likewise, where a fastener such as a bolt, rivet or the like is utilized for securing the handle to a tool, a receptacle is provided for the fastener and an upper bead is provided about the receptacle that is compressed by the fastener and produces a sealing therebetween. This allows the cavity to remain watertight when the tool is used in liquids or cleaned.

OBJECTS AND ADVANTAGES OF THE INVENTION

Therefore, the objects of the present invention are: to provide a handle for use in conjunction with tools, especially commercial tools, that is comfortable, resilient and easy to grip by the user while providing a strong internal structure; to provide such a handle having a molded overlay that has at least two adjacent sections having different characteristics such as different colors; to provide such a handle constructed from a shell having at least one interior channel that allows flow of moldable material through the interior of the handle to a second overlay region or section subsequent to the application of a first overlay region or section on the surface of the handle; to provide such a handle including at least one gripping portion and one fastening portion adjacent to the gripping portion and wherein the fastening portion is hollow for reduction of weight; to provide such a handle wherein the fastening portion includes an extension of the over-mold beyond the shell in the region whereat the fastening section mates with the remainder of a tool to which it is to be secured, so that the extension compresses during joining of the handle to the remainder of the tool to seal an internal cavity against seepage or water; to provide a method of producing such a handle wherein a shell is provided and placed in a first mold and a first molding material to produce a first over-mold is applied to the shell in the first mold that covers a substantial portion of the exterior of the shell, thereafter the shell with the first over-mold thereon is placed in a second mold and a second molding material to produce a second over-mold or inlay and is placed on the shell into second molding regions in a second molding process, so as to cover regions of the shell exterior not covered by the first over-mold; to provide such a molding process wherein a channel is provided within the interior of the shell and the first mold blocks both the channel and the second molding regions from application of the first molding material during the first molding process; to provide such a molding process wherein the second molding material is applied through the channel to the second molding regions from an underside of the handle to prevent parting lines and gating blemishes on the visible surface of the gripping portion of the handle; to provide such a molding process that allows for application of the first molding material and the second molding material in adjacent regions with a smooth transition therebetween and, preferably, with a substantially uniform thickness therebetween so as to provide a clean, long lasting combined over-mold; to provide such a method that allows for application of separate regions to the surface of the handle that are of substantially different characteristics, such as hardness or color; and to provide such a handle which is comparatively inexpensive to produce, very usable in service and especially well adapted for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a top plan view of a shell used in construction of a tool handle in accordance with the present invention.

FIG. 2 is a side elevational view of the shell.

FIG. 3 is a bottom plan view of the shell.

FIG. 4 is an enlarged cross-sectional view of the shell, taken along line 4—4 of FIG. 1, shown with a first mold placed thereabout.

FIG. 13 is an enlarged, fragmentary and cross-sectional view of the shell, taken along line 13—13 of FIG. 1, and showing a bolt positioned therein in phantom.

FIG. 14 is an enlarged, fragmentary and cross-sectional view of the completed handle, taken along line 13—13 of FIG. 1.

FIG. 15 is an enlarged, fragmentary and cross-sectional view of the completed handle, taken along line 15—15 of FIG. 14.

DETAILED DESCRIPTION OF THE INVENTION

Figure 5:
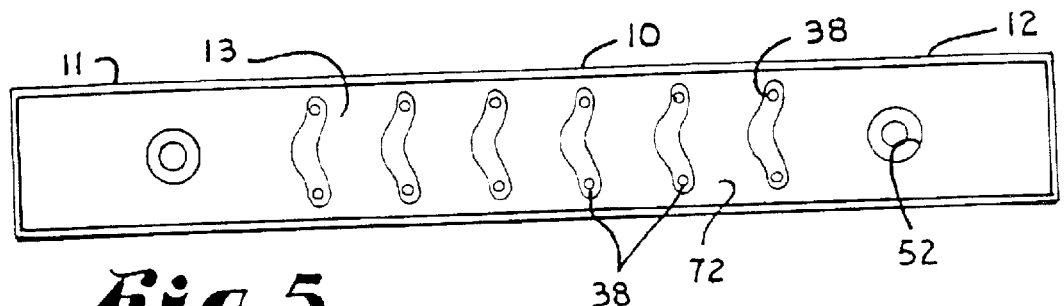
FIG. 5 is a top plan view of a pre-handle subsequent to a first mold procedure with a first over-mold section on the shell and after removal from the mold shown in FIG. 4.
Figure 6:
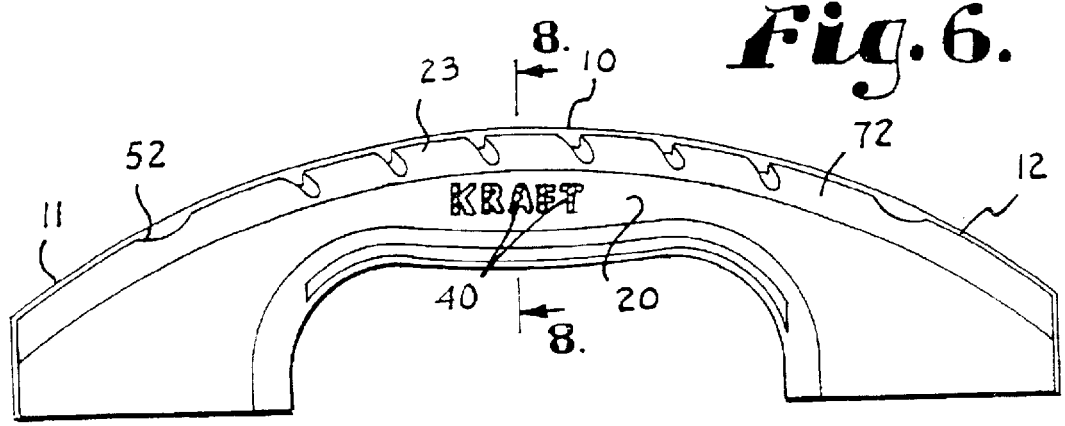
FIG. 6 is a side elevational view of the pre-handle shown in FIG. 5.
Figure 7:
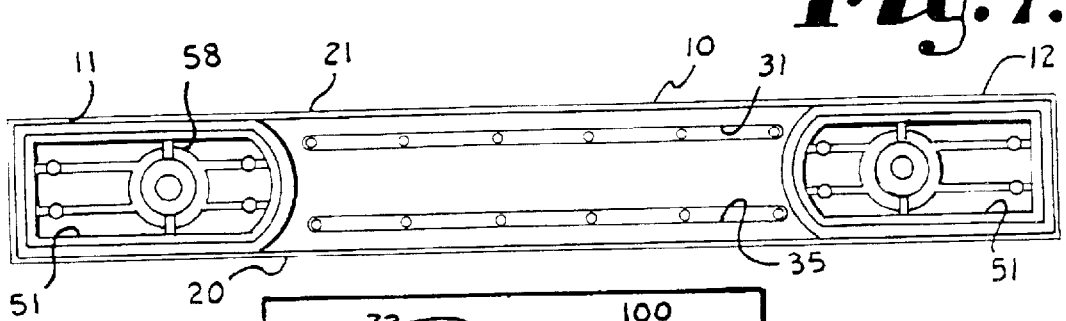
FIG. 7 is a bottom plan view of the pre-handle shown in FIG. 5.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally represents a tool handle in accordance with the present invention. The tool handle 1 is joined with a blade 4 or the like to produce a complete tool 5 such as is shown in FIG. 15.

The handle 1 has a center gripping section or portion 10 and opposed fastening sections or portions 11 and 12 integrally joined to the center gripping portion 10. The completed handle is shown in FIGS. 9, 10, 11, 12, 14 and 15.

The handle 1 is constructed in a process that is described in greater detail below by beginning with a shell 15 which is illustrated in FIGS. 1 through 3. The shell 15 has an outer frame 18 that is generally C-shaped in cross-section and which includes side panels 20 and 21 and a top panel 23. The side panels 20 and 21 are integrally joined to the top panel 23 and have a common exterior surface 25. Extending longitudinally through the gripping portion 10 of the handle 1 and from top to bottom, as seen in FIG. 2, are a plurality of ribs 28. In the present embodiment there are four ribs 28 in addition to the side panels 20 and 21 which parallel the ribs 28. The side panels 20 and 21 and the ribs 28 are approximately equally spaced from one another and define flow channels 31 to 35 therebetween.

The two outermost channels 31 and 35 communicate with the exterior surface 25 on the top panel 23 through a plurality of ports 38. The outer channels 31 and 35 also communicate with the exterior surface 25 on the side panels 20 and 21 through a plurality of ports 40.

The central channel 33 communicates with the exterior surface 25 on the top panel 23 through a plurality of ports 42 and the intermediate channels 32 and 34 also communicate with the exterior surface 25 on the top panel 23 through a plurality of ports 43. The center gripping portion 10 is separated from the fastening portion 11 and 12 by curved walls 46 and 47 that extend from near the top to near the bottom of the handle 1 and operably prevent passage of fluid between the center portion 10 and fastening portions 11 and 12.

The fastening portions 11 and 12 each include a hollow cavity 49 and 50 respectively which are defined by the walls 46 and 47 in conjunction with the shell 15 with the exception of having a mold withdrawal opening 51 on the underside thereof and a fastener opening 52 on an upper side thereof. Each of the fastening sections 11 and 12 have a pair of longitudinal ribs 55 and 56 and a cross rib 57 that provide strength to the structure and a fastener receiving structure 58 that is operably positioned beneath the fastener opening 52 in the shell 15.

The fastener receiving structure includes an upper cylindrical wall 60 joined to a lower cylindrical wall 61 of smaller diameter at a shoulder 62. The receiving structure 58 is sized and shaped to receive a fastener, such as a rivet on the illustrated bolt 64, for securing the handle 1 to the blade 4. The bolt 64 includes a head 65 and a threaded shank 66. The upper cylindrical wall 60 has a large enough diameter to receive the bolt head 65 and a lower cylindrical wall 61 is sized and shaped to snugly receive the threaded shank 66. Extending in a circle around the shoulder 62 and inward from the lower cylindrical wall 61 is a V-shaped bead 68 that is compressed as the bolt 64 is tightened so as to seal thereabout. The handle 1 has a molded covering 70 that extends over the entire outer exterior surface 25 of the shell 15 except in the location of the lower openings 51 and fastener openings 52. The covering 70 is two part, having a first part or section 72 that covers a substantial portion of the shell 15 and a second part or section 73 which has non-integral portions and which mates with and adjoins the section 72 which in many cases entirely surrounds portions of the section 73 so as to produce an inlay. In particular, the section 73 has upper chevron-shaped portions 75 that are spaced and form a pattern or artistic design on the top panel 23. The section 73 also has portions 76 located on the side panels 20 and 21 which in the present embodiment are in the shape of lettering.

The sections 72 and 73 are constructed of first and second outer mold materials and are of approximately the same thickness on the shell 15 so as to form smooth transitions therebetween. In the present embodiment the first and second mold materials are similar in many ways having a preferred durometer in a range of from 60 to 70 and being relatively soft and pliable with a thickness of about 80 to 110 thousands of an inch over the entire shell 15. In some embodiments the durometer could vary outside the above noted range when it is desirable to have two different durometers. In the present embodiment the first and second mold materials are of substantially different color so as to provide a contrast between the sections 73 and 72. In particular, the section 73 portion second portion 76 includes writing that visually stands out in comparison to the section 72 and the section 73 portion 75 includes a design which visually stands out in comparison to the section 72. While in the present embodiment the difference between the first and second mold materials after curing has been described as being with respect to color, it is foreseen that in some embodiments other characteristics could be modified such as relative hardness or the like to improve grip or abrasion in certain areas and for other purposes. The mold materials may vary with different plastics, but are preferably polyurethanes or polypropylenes.

In the molding process the first mold material also fills the channels 32, 33 and 34 between the interior ribs 28. The second mold material fills the outer channels 31 and 35 that are located between the side panels 20 and 21 and the ribs 28 respectively. A circumferential ring 79 of molding material extends slightly below the shell 15 about the opening 51, as is seen in FIG. 13. When the handle 1 is joined to the remainder of the tool 5, the ring 79 is compressed to produce a watertight seal therebetween, as seen in FIG. 15. The seal thus formed in conjunction with the seal formed by the bead 68 in conjunction with the bolt 64 renders the cavities 49 and 50 watertight.

A pair of molds 85 and 86 are utilized in conjunction with the shell 15 to produce a final and completed handle 1. The molds 85 and 86 are shown in a somewhat simplified and schematic matter in order to illustrate the process for producing the handle 1, as molds and molding apparatus of this type are well known in the industry.

The mold 85 has an upper element 89 and a lower element 90. The upper element 89 is generally spaced from the shell exterior surface 85 the thickness of the intended covering 70 and, in particular, the section 72. Portions 92 of the upper element 89 occlude the regions to be covered by the sections 73. A pair of mold core slides 93 are operably positioned inwardly and abut against the shell 15 during the molding process so as to occlude the ports 40.

The lower element 90 is also preferably mostly spaced from the shell ribs 28 the expected width of the covering 70 except in the regions of the exterior channels 31 and 35 wherein the lower element 90 has a pair of plugs 95 that abut against the channels 31 and 35 so as to preclude flow of the first molding material thereinto. The mold 85 has an internal manifold 96 that has openings 96 and 97. The openings 96 communicate with the lower end of the exterior surface of the side panels 20 and 21, whereas the openings 98 abut an underside 82 of the shell 15 and flow communicate with the interior channels 32, 33 and 34. In this manner as the first molding material flows through the manifold 96, the first molding material enters the channels 31, 32 and 33 and the space between the exterior surface 25 and the mold 85 and eventually cures in the channels 31, 32 and 33 as well as in the over-mold or cover section 72. The ports 42 and 43 allow flow of the first molding material between the exterior surface 25 and the channels 32, 33 and 34. Once the first molding material has entered and completely filled the channels 32, 33 and 34 as well as the first section 72 located between the exterior surface 25 and the mold 85, and has cured sufficiently, the mold 85 is removed.

Figure 8:
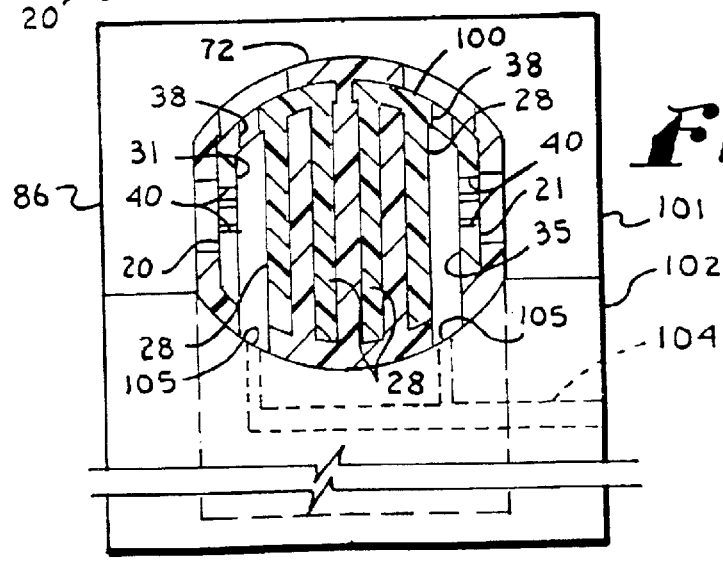
FIG. 8 is an enlarged and cross-sectional view of the pre-handle shown in FIG. 5, taken along line 8—8 of FIG. 6, and also shown in conjunction with a second mold placed thereabout.
Figure 9:
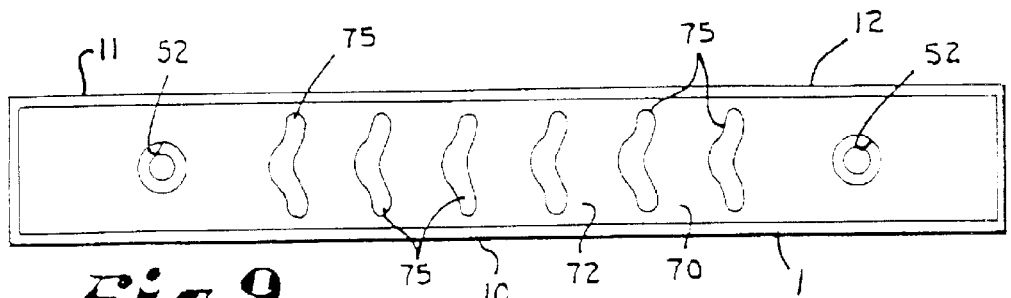
FIG. 9 is a top plan view of the completed handle subsequent to removal from the mold shown in FIG. 8.
Figure 10:
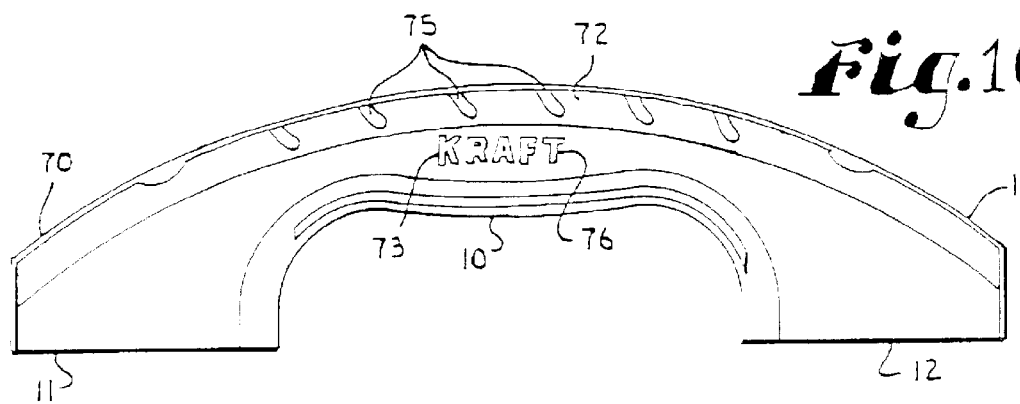
FIG. 10 is a side elevational view of the completed handle.
Figure 11:
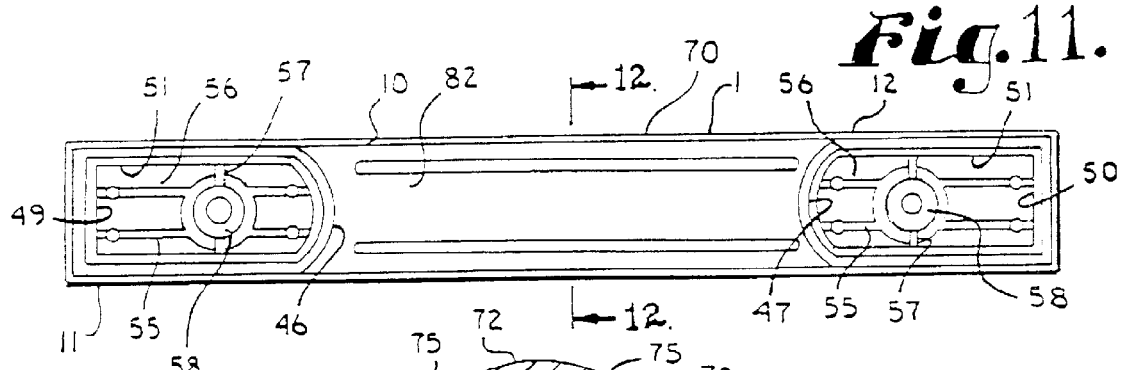
FIG. 11 is a bottom plan view of the completed handle.
Figure 12:
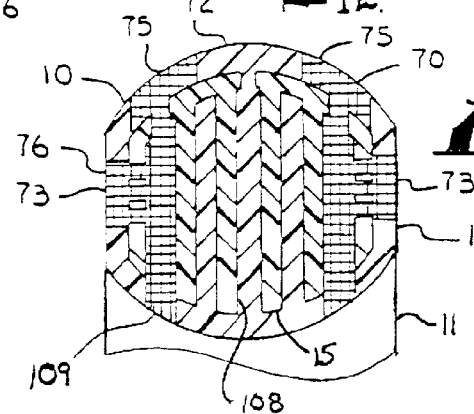
FIG. 12 is an enlarged, fragmentary and cross-sectional view of the completed handle, taken along line 12—12 of FIG. 11.

Thereafter, a product 100 of the first mold 85 is inserted into the second mold 86, as is illustrated in FIG. 8. The second mold includes an upper element 101 and a lower element 102. The upper element snugly fits about the first mold product 100 except in the regions associated with the second sections 73 where open space for the sections 73 is provided. The second mold lower element 102 has a flow manifold 104 that has openings 105 that are aligned with the channels 31 and 35. In this manner, as a second molding material is flowed through the manifold 104, it enters the channels 31 and 35 and flows through the interior of the shell 15 to the locations of section 73 and, in particular, to portions 75 and 76 thereof. The second molding material fills and remains in the channels 31 and 35, as well as the over-mold section 73 subsequent to curing. The molding material in the channels 31 to 35 cooperates with the shell 15 to produce a strong yet pliable structure to allow firm gripping of the handle 1. In particular, the molding material flows from the channel 31 and 35 through the ports 40 into the section portions 76 and through the ports 38 to the second section portions 75. Once the second molding material has cured sufficiently, the second mold 86 is removed and the handle 1 is complete. A cross-section of the handle 1 subsequent to the second molding operation is seen in FIG. 12 with the shell 15 cross-sectioned with diagonals to the right, the first mold material 108 cross-sectioned with diagonals to the left and the second mold material 109 being cross-sectioned with cross-hatching. As can be seen in FIG. 12, the entire center gripping portion 10 of the handle 1 is filled with either the shell 15 or the first molding material 108 or the second molding material 109.

In accordance with the present invention, a first molded section 72 is placed upon a supporting shell 15. Subsequently, a second molding section 73 is placed upon the shell as an inlay or in interspaced locations between the section 72 by flowing the material of the second molding material through an interior of the shell 15. This allows the second molding material in section 73 to be completely surrounded by the first molding material in section 72 and both to be fully exposed to the exterior once the handle 1 is removed from the second mold 86. This also allows the second molding material of the section 73 to be placed on the shell 15 without creating blemishes due to gate marks or parting lines that would be produced if the second molding material flowed directly from the mold 86 into the section 73.

It is to be understood that while certain forms of the present invention have been illustrated and described herein, it is not to be limited to the specific forms or arrangement of parts described and shown.

What is claimed and desired to be secured by Letters Patent is as follows:

1. A method of producing a tool handle comprising the steps of:

a) providing a shell having an exterior surface, an underside and an interior channel communicating between said exterior surface and said underside;

b) placing said shell in a first mold such that a first region of said shell exterior surface is spaced from said mold;

c) flowing a first molding material onto said first region of said shell exterior surface;

d) allowing said first molding material to substantially cure;

e) removing said first mold from said first molding material;

f) placing said shell in a second mold such that a second region of said shell exterior surface is spaced from said second mold;

g) flowing a second molding material from said underside of said shell through a first channel onto said second region of said exterior surface;

h) allowing said second molding material to substantially cure;

i) removing said second mold from said second molding material;

j) whereby said first and second molding material form a continuous overcoating on said shell exterior surface subsequent to removal of said first and second molds from said first and second molding materials.

2. The method according to claim 1 wherein said channel is a first channel, including step of:

a) providing a second channel communicating between said underside and said regions of said exterior surface spaced from said mold; and b) flowing at least a portion of said first molding material through said second channel onto said exterior surface.

3. The method according to claim 2 including the step of:

a) providing structure on said first mold to block flow of said first molding material into and through said second channel while said first molding material is applied to said exterior surface.

* * * * *